March 30, 1937.  E. C. LEIBIG  2,075,446

COLORED GLASS ARTICLE AND METHOD AND MEANS FOR MAKING IT

Filed Oct. 13, 1934

INVENTOR.
EDWARD C. LEIBIG
BY Dorsey & Cole
ATTORNEYS.

Patented Mar. 30, 1937

2,075,446

UNITED STATES PATENT OFFICE 2,075,446

COLORED GLASS ARTICLE AND METHOD AND MEANS FOR MAKING IT

Edward C. Leibig, Corning, N. Y., assignor to Corning Glass Works, Corning, N. Y., a corporation of New York Application October 13, 1934, Serial No. 748,267

20 Claims. (Cl. 49—88)

This invention relates to methods of coloring glass and more particularly to the method known in the art as staining or red and yellow etching.

Heretofore glass articles have been colored or stained by firing into the surface thereof a paint or paste containing a copper or silver salt mixed with ochre and an essential oil or by spraying the hot glass with a dilute solution of copper or silver salt followed by a heat treatment. As a result of such treatments the copper or silver atoms penetrate a very slight distance into the surface of the glass and impart their characteristic coloration to a very thin layer thereof. Glass articles colored by this method therefore resemble in appearance articles colored by the flashing process which comprises first gathering glass of one color and then covering it with glass of another color and subsequently forming the article by blowing. Flashing requires considerable skill in gathering and the spoilage is always high due to uneven coloring particularly in the case of flashed copper ruby glass. The staining process would therefore be a desirable substitute for flashing, particularly inasmuch as the flashing process, insofar as I know, is applicable only to blown articles whereas the staining process being employed after fabrication can be applied to any article whether blown, pressed, or drawn.

However, in coloring glass articles by prior staining methods, difficulty is experienced with non-uniformity of color for, although the greatest care be exercised in applying the paste or spray uniformly, minute colorless areas commonly known as "pin holes" invariably appear in the colored layer when finished. The control of color, that is, the facility with which a definite shade or hue can be produced is likewise attended with difficulties on account of variation in the composition of the paste or spray, in the uniformity of application and in the time, temperature and state of reduction during firing. Furthermore, prior staining methods are too expensive to offer any advantage over flashing in this respect.

It is the object of this invention to increase the tensile strength of glass.

Another object is to color or stain glass articles with uniformity and perfect control of color and to do it more economically than has heretofore been possible.

Still another object of the invention is to simplify the process of staining borosilicate glasses.

Among its embodiments my invention comprises dipping a glass article into a heated bath containing a molten salt of copper or silver or both and subsequently heating and annealing the article with or without reducing conditions.

Another feature of my invention is a stained glass article, the colored surface layer of which contains about 80% less alkali than the interior uncolored portion thereof.

My invention further resides in the novel construction, combination and arrangement of parts to be more fully described herein, claimed in the appended claims, and illustrated in the drawing, in which:

Figure 3:
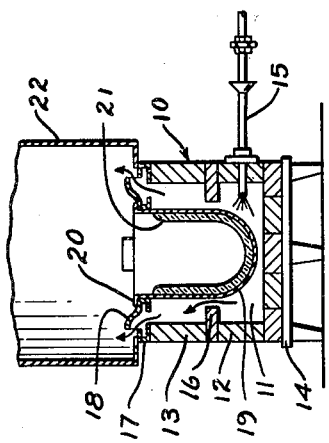
Fig. 3 is a vertical section on the line 3—3 of Fig. 2.
Figure 2:
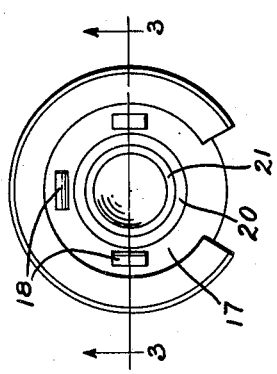
Fig. 2 is a horizontal section on the line 2—2 of Fig. 1.

In the drawing, a furnace which is designated generally 10 comprises in the present example a combustion chamber 11, a bottom and circular wall of refractory blocks 12, a sheet metal casing 13 around the wall and a circular cast iron supporting base 14. A gas burner 15 is placed so as to project tangentially through the wall 12 into the combustion chamber 11. A ring of bricks 16 projects from the wall 12 into the combustion chamber 11 above the burner 15 to form a baffle and prevent too rapid loss of combustion gases from the combustion chamber. On top of the wall 12 rests a ring 17 which forms the top of the furnace 10 and which is provided with ports 18 for the escape of combustion gases. In the present instance the ports 18 are three in number and are situated at intervals around the ring 17 excepting at the front or working side as shown in Figs. 2 and 3. An elongated hemispherical cast iron pot 19 is supported by means of a laterally projecting rim 20 resting on the inner edge of the ring 17 and hangs within the combustion chamber 11 within and adjacent the baffle ring 16. The pot 19 is provided with a lining 21 of low expansion highly stable glass which is preferably blown and molded directly in the pot 19, thus ensuring a satisfactorily close fit. In lieu of glass the lining 21 may be composed of porcelain, fire clay, or other material which is resistant to molten copper chloride but I have found glass to be particularly suitable. A sheet metal hood 22 which is provided with a working opening 23 rests on the ring 17 and serves to confine the escaping combustion gases and noxious fumes which may be evolved from the melting pot and discharges them into an exhaust line 24.

Figure 1:
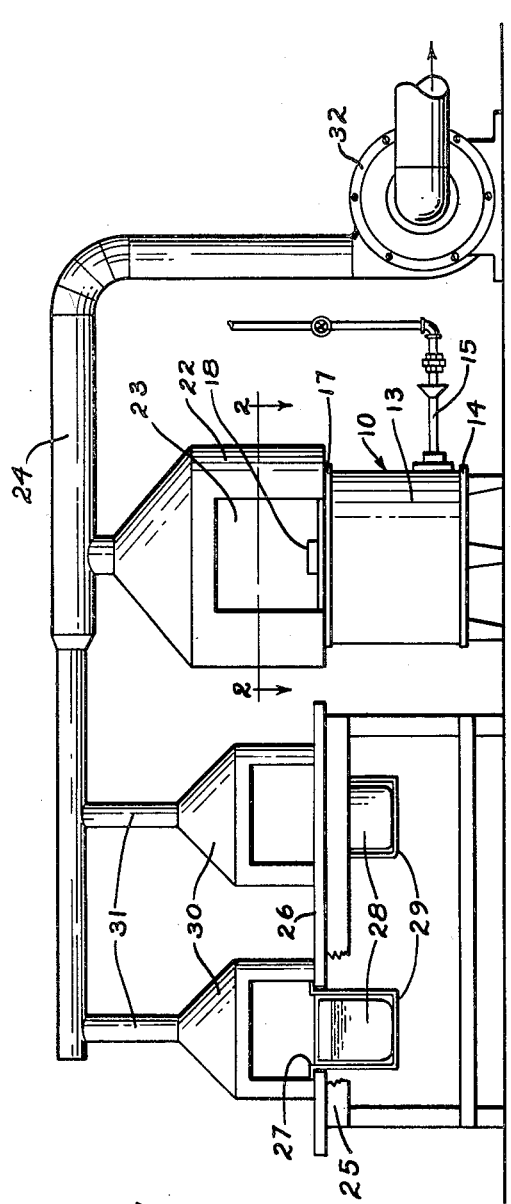
Fig. 1 is an elevation showing the various units of an apparatus for practicing my invention.

A work table 25 has a top 26 which is provided with two circular openings only one of which is shown in the cut-away portion of Fig. 1 at 27. Beneath the openings and approximately flush with the table top, jars 28, of a suitable acid resistant material, are suspended in supporting frames 29. Supported above the jars 28 are hoods 30 which are connected through pipes 31 to the exhaust line 24 for the removal of fumes. An exhaust fan 32 withdraws all fumes from the exhaust line 24 and disposes of them in any suitable manner, as by scrubbers and ventilating stacks (not shown).

In practicing my invention a quantity of copper chloride is melted in the pot 19, the temperature of the molten bath being controlled by means of a thermocouple (not shown) encased in a glass tube and immersed therein. Cuprous chloride does not fume as strongly when molten as cupric chloride and therefore the cuprous salt is generally to be preferred.

The glass article is dipped into the molten salt and after the proper time of immersion it is removed. A color will be obtained, the intensity of which will depend both upon the temperature of the molten bath and upon the time of immersion, a higher temperature and a longer time in general producing a denser color. However, the maximum suitable temperature will be limited by the softening temperature of the glass and for temperatures near the softening point the time of immersion must be shorter than for lower temperatures in order to avoid distortion of shape, particularly in the case of thin walled articles. I have found that articles made of the glass $B_2$ of the Sullivan and Taylor Patent 1,304,623 will acquire desirable coloration when dipped for about four or five minutes at 650° C. Articles made of soda lime glass require about four to five minutes at about 625° C. In any case the proper time and temperature may readily be determined by trial.

After the article has been removed from the molten copper chloride, it is allowed to cool and is then washed in a strong solution of hydrochloric acid, preferably concentrated acid which is contained in the jars 28 for the purpose of removing the residual coating of solidified copper chloride which has remained thereon. At this stage of the process the color which has been imparted to the surface layer of the glass by the above treatment is yellow.

Prior workers in this field have shown that ordinary glasses, when stained yellow with copper salts, subsequently require both a reducing heat and an oxidizing heat to convert the yellow color to red. That is to say, in ordinary glasses the initial yellow coloration caused by the copper salts is changed to a black when the glass is subsequently heated reducingly and is then changed to red by reheating the glass again under oxidizing conditions.

Figure 4:
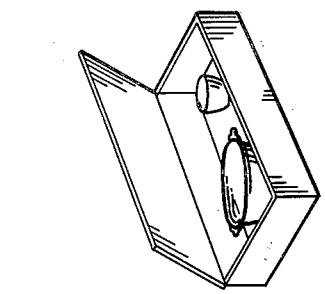
Fig. 4 is a perspective view of a sheet iron annealing receptacle.

I have found that in the case of borosilicate glasses the yellow coloration may be converted directly to red merely by heating in a reducing atmosphere. By the term "borosilicate glasses" as used herein, I mean glasses which contain not less than 5% of boric oxide if they are substantially free of second group oxides and not less than 10% of boric oxide if the second group oxides are present. Since the articles must be annealed after immersion in the molten bath, I prefer to accomplish the annealing and reduction in one step, although in case the yellow coloration is to be retained without conversion into red the articles are annealed in the usual manner under oxidizing conditions or with free access of the air. Reduction is best accomplished by sealing up the articles together with a suitable reducing agent in the annealing receptacle shown in Fig. 4 after which the receptacle and its contents are passed through a leer. As a reducing agent I prefer to use paraformaldehyde, since this does not cause formation of soot on the articles, but I have also used urea and glycerine with good results. For some purposes urea is preferable to paraformaldehyde, as will later appear. In case the articles so reduced were borosilicates, the initial yellow coloration is converted directly to red, the density depending upon the amount of reducing agent used and the time and temperature of immersion. In case the glass contains arsenic, an amber color may be produced in lieu of red by using milder reducing conditions. In producing amber and light ruby in this way, I have found it advantageous to employ urea as the reducing agent, since I have found that weight for weight it is not as effective as paraformaldehyde and hence greater latitude is permissible in weighing out the urea. For example, I have found that in a receptacle of about two cubic feet capacity twenty grams of paraformaldehyde will cause complete reduction to a deep red coloration if the time and temperature of immersion were sufficient and thirty grams of urea will cause partial reduction to an amber or a light red. Other degrees of reduction may readily be determined by trial.

In case the treating bath is composed of a molten silver salt, there is produced an amber coloration which is not changed by subsequent heating under reducing conditions. I am, therefore, able to produce an amber coloration without reduction either by using a bath of molten silver salt or by adding a silver salt such as silver chloride to the molten bath of copper chloride in which it is readily soluble or miscible. In this case the amber color is obtained directly after immersion of the object in the molten bath without a subsequent reduction, although annealing, of course, is necessary. The color produced by using silver chloride in the bath varies from yellow to a very deep amber, depending on the concentration of silver, other factors remaining constant. I have found that when the bath contains twenty percent of silver chloride a bright amber color is obtained. A higher concentration of silver will produce a deeper color. Various shades of amber may thus be obtained by suitable alteration of the silver content as well as by change of temperature or time of immersion.

In the case of non-borosilicates, such as soda lime glasses, it is necessary to introduce into the copper salt bath a sulphide, such as copper sulphide, in order to produce penetration of the copper ions into the glass. Copper sulphide does not dissolve in molten cupric chloride but gradually is decomposed and taken into solution as cuprous chloride, the sulphur being oxidized and lost. However, copper sulphide is readily soluble without serious decomposition in molten cuprous chloride and I therefore use the latter in preparing the bath. Other sulphides which are soluble in molten cuprous chloride may be used in lieu of copper sulphide. I have found that a copper sulphide content of about 5% will produce coloration in a soda lime glass.

In this case also the initial color is yellow and may be converted to red by suitable reduction as described above. However, in the case of soda lime glasses the effect of reduction is to produce a black opaque coloration which is subsequently changed to the final red coloration by a second reheating in the air, such as by simply passing the articles through the leer in an open container.

As another embodiment of my invention I may use any suitable inert or non-corrosive low melting salt as a bath and add thereto the coloring salt. For example, I may use a bath of molten stannous chloride or lead chloride which does not attack glass and add thereto a sufficient amount of copper or silver salt, such as the chloride, sulphide, borate, etc., to produce coloration of articles dipped therein. To obtain various shades of amber without the necessity of reduction, I have found it advantageous to use a bath of molten lead chloride containing silver chloride. In this case ten percent of silver chloride will produce a light amber.

Although the penetration of copper or silver ions into the glass depends primarily upon the temperature of the molten bath and the time of immersion of the article therein, I have found that it also depends upon the presence of alkali in the glass composition and glasses which are substantially free from alkali can not satisfactorily be treated by my method. Analysis of a sample of glass which had been colored by my process showed that the alkali content of the colored layer had decreased about 80%. A similar sample was remelted so as to mix the colored layer with the uncolored portion of the glass and an approximate determination of the coefficient of thermal expansion of the remelted sample showed that the expansion coefficient of the original glass had decreased about 10% which was probably due to the decrease in alkali content. In view of these facts I assume that coloration is caused by penetration of the copper or silver atoms or ions into the surface of the glass and a corresponding extraction of alkali atoms or ions from the surface of the glass. In other words, the copper or silver is able to replace alkali from the glass. The presence of alkali in the molten bath reduces the tendency of the copper or silver ions to replace the alkali ions of the glass and a too high concentration of alkali in the molten bath prohibits the reaction entirely. The addition to an otherwise active bath of 10% of sodium chloride prevents coloration of a borosilicate glass containing 4.5% alkali when dipped therein regardless of temperature or time of immersion. Therefore, if and when the concentration of alkali builds up in the bath after long use to such an extent as to reduce the efficiency thereof, it is necessary to dilute it by the addition of more staining salt.

My improved method not only causes a deeper penetration of copper or silver ions into the glass than the prior method hereinbefore referred to, but it also causes a more complete replacement of the alkali of the penetrated layer of glass by the staining ion. For example, glass containing 4.3% alkali, which had been dipped in molten copper chloride, was treated with hydrofluoric acid until the colored layer was dissolved to a depth of about .016 mm. The resulting solution showed on analysis an alkali content of .88% which indicated that about 80% of the alkali in the colored layer had been replaced. On the other hand, some of the same glass which had been stained by the prior method of applying a copper staining paste and firing it into the glass, was treated with hydrofluoric acid until the colored layer, which was thinner in this case, was dissolved to a depth of about .0025 mm. The resulting solution showed on analysis an alkali content of 2.6% which indicated that in this case only about 39% of the alkali in the colored layer had been replaced.

From the above it will be obvious that my invention constitutes a distinct advance in the art, since in prior methods of staining the free migration of alkali from the glass to be replaced by copper or silver was hampered not only by the lower mobilities of the ions due to the lower temperature used but also by the relatively small amount of copper or silver salt in contact with the glass which allowed the concentration of alkali in the applied salt rapidly to approach the point of inhibition. In my method the alkali on being extracted from the glass migrates through the bath and is rapidly removed from the reaction zone and hence a high degree of speed and control can be obtained which results in greater economy and improved quality.

Glass articles colored by my process may be substituted for prior articles of flashed or solid color, but whereas the expansion coefficient of prior colored glass is limited due to the difficulty of obtaining true colors in glasses of low alkali content, the expansion coefficient of glass colored by my process is not so limited providing the glass is not free from alkali. By means of my invention I am able to color incandescent lamp bulbs so that they are satisfactory substitutes for the well known flashed copper ruby bulbs. Flashing with copper ruby glass is the only method, insofar as I know, of producing red bulbs which are suitable for use in photographic dark rooms and the like. Flashing, as pointed out above, is an expensive and unreliable process. Prior staining methods are of little value in this respect, due to uneven coloring and the prevalence of pin holes. By immersing clear bulbs in my molten bath so as to treat them both inside and out, in accordance with the above described process, I am able to produce ruby bulbs which are satisfactory substitutes for prior flashed bulbs at a great saving in cost of production. Bulbs thus produced are absolutely free from pin holes, are of uniform color throughout and answer the rigid requirements of the photographic industry.

My method of treating glass articles with copper salts can also be used to increase the tensile strength of such articles. As pointed out above, my method of treatment results in a replacement of 80% of the alkali atoms in the surface of the glass by the coloring atoms during the immersion of the article in the molten salt bath. Since copper has a lower expansion factor than the alkali which is replaced, the expansion coefficient of the colored surface is lower than that of the uncolored interior portion of the glass. This results in a layer of compressional stress all over the article, which increases its tensile strength.

In general I have found that the increase in strength is greater as the difference in expansion coefficients of the surface layer and the interior portion increases. In other words, a glass of high expansion, when treated by my method, will have a greater increase of tensile strength than a glass of low expansion treated in the same manner. However, the increase in tensile strength of a given glass will depend to some extent on the thickness of the colored surface layer, because this layer should be at least of such thickness that it will not be cut through by scratches and abrasions incidental to ordinary use. By prior methods the staining atoms do not penetrate deep enough to accomplish this, but by means of my method the thickness of the colored layer may be increased by raising the temperature of the molten salt bath or by increasing the time of immersion. For example, rods of about 5 mm. diameter of the glass $B_2$ of the Sullivan and Taylor Patent 1,304,623 having an expansion coefficient of about $.0_532$, were treated and tested with the following results: Ten rods in each group were tested and all were scratched with emery before testing to make them uniform as regards surface flaws and to avoid inaccuracies which might arise due to one rod accidentally being abraded normally more than another.

| Temp. of bath | Time of immersion | Average percentage increase in strength |
|---|---|---|
| | | Percent |
| 650° C. | 10 min. | 21½ |
| 650° C. | 20 min. | 31 |
| 650° C. | 1 hour | 44 |
| 600° C. | 51 hours | 57 |

Although the strength of the rods seemed to increase with increase in the thickness of the colored layer or time of immersion, this was probably due to the fact that as the thickness of the colored layer increased it was less often scratched through.

To illustrate how the tensile strength of treated rods increases as the difference in expansion coefficient of the outer layer and the interior portion of the glass increases, rods of a glass having an expansion coefficient of about $.0_550$ were treated and tested in a similar manner. In this case 10 rods which had been immersed for one hour in the bath at 650° C. showed an average increase in tensile strength of 165%.

Since the ability of glasses of high expansion coefficient to withstand thermal shock is less than that of glasses of low expansion, it is necessary to preheat such glasses before they are immersed in the treating bath.

My method of increasing the tensile strength of glass articles is an improvement over the prior method of strengthening by casing or flashing the glass with a layer of lower expansion, because my method produces an outer layer whose thickness is uniform. Moreover, in articles made by my process the outer layer of low-expansion glass completely surrounds the articles, whereas in the prior method of casing glass articles the outer layer is discontinuous at the point where the article is severed from the working tool.

Although in the foregoing I have shown and described the preferred embodiment of my invention, it is to be understood that minor changes in the details of construction, combination and arrangement of parts may be resorted to without departing from the spirit and scope of my invention as claimed.

In the claims the term "staining salt" is meant to include only those salts such as the chloride, sulphate, etc., of copper or silver which, when heated in contact with an alkali-containing glass, will cause coloration of the surface layers of the glass by penetration therein of atoms or ions of the copper or silver and an extraction therefrom of alkali atoms or ions.

This application is a continuation in part of my pending application, Serial Number 662,179, filed March 22, 1933.

What I claim is:

1. The method of treating alkali-containing glass articles, which includes causing a rapid exchange of alkali ions contained in the surface of the glass with staining ions contained in a molten staining salt into which the glass surface is dipped.

2. The method of treating alkali-containing glass articles, which includes causing a rapid exchange of alkali ions contained in the surface of the glass with color producing copper ions contained in a molten copper salt into which the glass surface is dipped.

3. The method of treating alkali-containing glass articles, which includes causing a rapid exchange of alkali ions contained in the surface of the glass with color producing silver ions contained in a molten silver salt into which the glass surface is dipped.

4. The method of treating alkali-containing glass articles, which includes dipping them into a heated bath containing a molten salt of a metal of the copper sub-group of the first periodic group having an atomic weight between 63 and 108.

5. The method of treating alkali-containing glass articles, which includes dipping them into a heated bath containing a molten copper salt.

6. The method of treating alkali-containing glass articles, which includes dipping them into a heated bath containing a molten silver salt.

7. The method of treating alkali-containing glass articles, which includes dipping them into a heated bath containing molten copper and silver salts.

8. The method of treating alkali-containing glass articles, which includes dipping the article into a heated bath containing a molten salt of a metal of the copper sub-group of the first periodic group having an atomic weight between 63 and 108, removing the article from the bath, cooling it, washing off the residual solidified salt and annealing the article.

9. The method of treating alkali-containing glass articles, which includes dipping the article into a heated bath containing a molten copper salt, removing the article from the bath, cooling it, washing off the residual solidified salt, and annealing the article.

10. The method of treating alkali-containing glass articles, which includes dipping the article into a heated bath containing a molten silver salt, removing the article from the bath, cooling it, washing off the residual solidified salt and annealing the article.

11. The method of treating alkali-containing glass articles, which includes dipping the article into a heated bath containing a molten copper salt and a molten silver salt, removing the article from the bath, cooling it, washing off the residual solidified salt, and annealing the article.

12. The method of treating alkali-containing glass articles, which includes dipping the article into a bath of molten copper chloride, removing the article from the bath, cooling it, washing off the residual copper chloride with hydrochloric acid, and annealing the article.

13. The method of treating alkali-containing borosilicate glass articles, which includes dipping the article into a heated bath containing a molten copper salt, removing the article from the bath, cooling it, washing off the residual solidified salt, and annealing the article under reducing conditions.

14. The method of treating alkali-containing borosilicate glass articles, which includes dipping the article into a bath of molten copper chloride, removing the article from the bath, cooling it, washing off the residual copper chloride with hydrochloric acid, and annealing the article in a closed container which contains a definite amount of a reducing agent.

15. The method of treating alkali-containing non-borosilicate glass articles, which includes dipping the article into a heated bath containing molten copper chloride and sulphide, removing the article from the bath, cooling it, washing off the residual solidified salt, and annealing the article.

16. The method of treating alkali-containing non-borosilicate glass articles, which includes dipping the article into a heated bath containing molten copper chloride and sulphide, removing the article from the bath, cooling it, washing off the residual solidified salt with hydrochloric acid, heating the article under reducing conditions and subsequently reheating it under non-reducing conditions.

17. The method of coloring glass red, which includes heating an alkali containing borosilicate glass in contact with a copper staining salt until a yellow coloration is produced in the surface of the glass, removing the residual staining salt from the glass and reheating the glass under reducing conditions until the yellow coloration is changed to red.

18. The method of coloring glass red, which includes dipping an alkali-containing borosilicate glass into a molten bath of copper staining salt, removing the residual staining salt from the glass and reheating the glass under reducing conditions.

19. The method of coloring glass red, which includes applying to an alkali-containing borosilicate glass a copper staining salt, heating the glass until a yellow coloration is produced in the surface thereof, removing the residual staining salt from the glass and reheating the glass under reducing conditions until the yellow coloration is changed to red.

20. The method of coloring alkali-containing glass incandescent lamp bulbs which includes immersing the bulb in a bath containing molten copper chloride and sulphide for a predetermined length of time at a predetermined temperature, removing the bulb from the bath, cooling it, washing off the residual copper chloride with hydrochloric acid, heating the bulb under reducing conditions and subsequently reheating it under non-reducing conditions.

EDWARD C. LEIBIG.